(12) United States Patent
Gonzalez

(10) Patent No.: US 8,118,159 B2
(45) Date of Patent: Feb. 21, 2012

(54) APPARATUS AND METHOD FOR SAFELY DISPOSING MEDICINES

(76) Inventor: Faustino Gonzalez, Wellington, FL (US)

(*) Notice: Subject to any disclaimer, the term of this patent is extended or adjusted under 35 U.S.C. 154(b) by 345 days.

(21) Appl. No.: 12/539,950

(22) Filed: Aug. 12, 2009

(65) Prior Publication Data

US 2010/0041937 A1  Feb. 18, 2010

Related U.S. Application Data

(60) Provisional application No. 61/088,428, filed on Aug. 13, 2008.

(51) Int. Cl.
*B65F 1/00* (2006.01)
*A61J 1/03* (2006.01)

(52) U.S. Cl. .......................... 206/223; 206/568

(58) Field of Classification Search .................. 206/223, 206/568, 205, 528, 540, 363, 370; 588/249; 220/86.1; 110/346
See application file for complete search history.

(56) References Cited

U.S. PATENT DOCUMENTS

| | | | |
|---|---|---|---|
| 4,534,489 A * | 8/1985 | Bartlett | 229/117.35 |
| 4,863,052 A * | 9/1989 | Lambert | 229/117.3 |
| 4,886,164 A * | 12/1989 | Stein et al. | 206/366 |
| 4,917,238 A * | 4/1990 | Schumacher | 206/223 |
| 5,097,950 A * | 3/1992 | Weiss et al. | 206/366 |
| 5,117,997 A | 6/1992 | Fink | |
| 5,148,940 A * | 9/1992 | Mendise | 229/117.35 |
| 5,193,740 A * | 3/1993 | Newborough et al. | 229/242 |
| 5,240,176 A * | 8/1993 | Akers | 229/155 |
| 5,385,105 A | 1/1995 | Withers | |
| 6,283,909 B1 * | 9/2001 | Sharp | 588/249.5 |
| 6,382,416 B1 * | 5/2002 | Gainey | 206/317 |
| 7,896,271 B2 * | 3/2011 | Wakeman | 241/100 |
| 2008/0139866 A1 * | 6/2008 | Fisher et al. | 588/249 |
| 2010/0258565 A1 * | 10/2010 | Isaacson et al. | 220/324 |

* cited by examiner

*Primary Examiner* — Steven A. Reynolds
(74) *Attorney, Agent, or Firm* — Aidenbaum Schloff and Bloom PLLC; Jay Schloff

(57) ABSTRACT

An apparatus and a method for safely disposing of medicines. The apparatus includes a container assembly and a bag. The container assembly includes a container member capable of storing the medicines, and a lid extending from a top portion of the container member. The bag includes a pair of gloves capable of being worn by a user for allowing hygienic handling of the medicines, one or more funnels capable of being configured in one or more openings of the lid for allowing receiving of the medicines and storing of the medicines in the container member, a first receptacle having a bittering agent capable of denaturing the stored medicines, a second receptacle having a coloring agent capable of providing a characteristic color to the denatured medicines and a third receptacle having a thickening agent capable of converting the denatured medicines into a partially solid disposable mass.

5 Claims, 3 Drawing Sheets

APPARATUS AND METHOD FOR SAFELY DISPOSING MEDICINES

CROSS REFERENCE TO RELATED APPLICATIONS

The present disclosure claims priority under 35 United States Code, Section 119 on the provisional application No. 61/088,428 filed on Aug. 13, 2008, the disclosure of which is incorporated by reference.

FIELD OF THE DISCLOSURE

The present disclosure relates to an apparatus and a method for safely disposing medicines, and more particularly, to an apparatus and a method that allows conversion of medicines into an easy-to-dispose mass.

BACKGROUND OF THE DISCLOSURE

The present procedures for disposal of medicines, especially expired medicines and unused medicines, pose a serious threat to public health. People dispose the medicines present in their residences by either flushing the medicines in public drainage system (i.e., down their toilets or sinks), or by throwing the medicines out with other household trash. Medical institutions, such as hospices and nursing homes, also follow a similar procedure. They dispose the medicines, present in their premises or homes of their patients, by flushing the medicines in the public drainage system. Some medical institutions follow a procedure of dissolving the medicines in hot water, absorbing them in diapers or mixing them in cat litter, before throwing them in the garbage.

The medicines flushed in the public drainage systems reach municipal water or effluent treatment plants of municipalities. Medicines disposed of with other regular trash reach landfills, where they leach into water bodies present in the landfills or into groundwater. These water bodies or groundwater supply usually flow out to municipal water or effluent treatment plants.

The effluent treatment plants are designed to efficiently remove conventional pollutants, such as sand particles and bacteria, from water and may be incapable of completely removing the medicines from the effluents. As a result, water with traces of medicines may reach our homes through a municipality-based water supply, because of the effluent treatment plant's inability to remove the medicine materials from the water before returning such water to a municipal water supply for human consumption.

The consumption of water polluted with traces of medicines by humans and animals may develop give rise to serious complications. Further, the complications may develop slowly and may be undetectable for long durations of time. An inadvertent and continuous consumption of the medicines may therefore be highly detrimental to public health. Therefore, there is a need to develop an efficient system for disposing medicines.

Moreover, the present procedures of disposal of medicines, especially psychotropic medicines, increased the chances of access to these medicines by unauthorized persons, such as addicts. Psychotropic medicines are highly addictive, and therefore, may lure addicts. The addicts may resolve to means, such as stealing, to acquire the psychotropic medicines discarded by the medical institutions. Therefore, there is a need to develop an efficient system for disposing medicines that reduces risk of stealing of the medicines by addicts and other unauthorized persons.

Various conventional disposal systems have been developed for safely disposing medicines and hazardous medical wastes, such as needle syringes, pathological and dental wastes, and surgical gloves. Though these conventional disposal systems have been effective in disposing hazardous medical wastes, they may be ineffective in disposing medicines.

Therefore, there exists a need to develop an apparatus that allows safe and environment friendly disposal of medicines, thereby ensuring that our municipality water supply is completely free from any traces of these medicines. Further, there is a need to develop an apparatus that prevents any access of the medicines by unauthorized persons. Furthermore, the apparatus should be lightweight, inexpensive to manufacture and portable. Moreover, the apparatus should be convenient to use, so that the general public may be able to use the apparatus without any undue problems.

SUMMARY OF THE DISCLOSURE

In view of the foregoing disadvantages inherent in the prior art, the general purpose of the present disclosure is to provide an apparatus and a method for safely disposing medicines, which includes all the advantages of the prior art, and overcomes the drawbacks inherent therein.

Accordingly, an object of the present disclosure is to provide an apparatus that allows a user to dispose of medicines in a safe and environment friendly manner.

Another object of the present disclosure is to provide an apparatus for safely disposing of medicines, such that the apparatus is lightweight, inexpensive to manufacture, portable and easy to use.

Yet another object of the present disclosure is to provide an apparatus for safely disposing medicines, such that, the apparatus prevents any unauthorized access of the medicines.

In light of the above objects, the present disclosure provides an apparatus for safely disposing of medicines. The apparatus includes a container assembly and a bag. The container assembly includes a container member having a bottom portion, a wall member extending from a periphery of the bottom portion and a top portion opposite to the bottom portion. The bottom portion and the wall member configure a housing capable of storing the medicines. Further, the container assembly includes a lid having one or more openings. The lid is integral to the container member and extends from a periphery of the top portion of the container member. The bag is capable of being attached to the container member. The bag includes a pair of gloves, one or more funnels, a first receptacle having a bittering agent, a second receptacle having a coloring agent and a third receptacle having a thickening agent. The pair of gloves is capable of being worn by a user for allowing hygienic handling of the medicines. The one or more funnels are capable of being configured in the one or more openings of the lid. The one or more funnels are capable of allowing receiving of the medicines for storing the medicines in the container member. The bittering agent is capable of denaturing the stored medicines, the coloring agent is capable of providing a characteristic color to the denatured medicines and the thickening agent is capable of converting the denatured medicines into a partially solid disposable mass. The partially solid disposable mass is capable of being incinerated, thereby safely disposing of the medicines.

In another aspect, the present disclosure provides a method for safely disposing of medicines. The method includes providing the medicines. Further, the method includes converting the medicines into a partially solid disposable mass, which is capable of being incinerated. Furthermore, the method includes incinerating the partially solid disposable mass, thereby safely disposing the medicines.

These together with the other aspects of the present disclosure, along with the various features of novelty that characterized the present disclosure, are pointed out with particularity in the claims annexed hereto and form a part of the present disclosure. For a better understanding of the present disclosure, its operating advantages, and the specified object attained by its uses, reference should be made to the accompanying drawings and descriptive matter in which there are illustrated exemplary embodiments of the present disclosure.

BRIEF DESCRIPTION OF THE DRAWING

The advantages and features of the present disclosure will become better understood with reference to the following detailed description and claims taken in conjunction with the accompanying drawings, and in which:

Like reference numerals refer to like parts throughout the description of several views of the drawings.

DETAILED DESCRIPTION OF THE DISCLOSURE

For a thorough understanding of the present disclosure, reference is to be made to the following detailed description, including the appended claims, in connection with the above-described drawing. Although the present disclosure is described in connection with exemplary embodiments, the present disclosure is not intended to be limited to the specific forms set forth herein. It is understood that various omissions and substitutions of equivalents are contemplated as circumstances may suggest or render expedient, but these are intended to cover the application or implementation without departing from the spirit or scope of the claims of the present disclosure. Also, it is to be understood that the phraseology and terminology used herein is for the purpose of description and should not be regarded as limiting.

The terms "a" and "an" herein do not denote a limitation of quantity, but rather denote the presence of at least one of the referenced item.

The use of "including," "comprising," or "having" and variations thereof herein is meant to encompass the items listed thereafter and equivalents thereof as well as additional items.

Further, the use of terms "first", "second", and "third", and the like, herein do not denote any order, quantity, or importance, but rather are used to distinguish one element from another.

Unless limited otherwise, the terms "configured," "disposed," "placed," "attached" and variations thereof herein are used broadly and encompass direct and indirect attachments, couplings, and engagements. In addition, the terms "attached" and "coupled" and variations thereof are not restricted to physical or mechanical attachments or couplings.

The present disclosure provides a method and an apparatus for safely disposing of medicines. The term 'medicine' as mentioned herein refers to a chemical or biological substance that may be used to treat, prevent or alleviate symptoms of a disease. The method for safely of disposing medicines of the present disclosure will now be described with reference to FIG. 1A and FIG. 1B.

Figure 1:
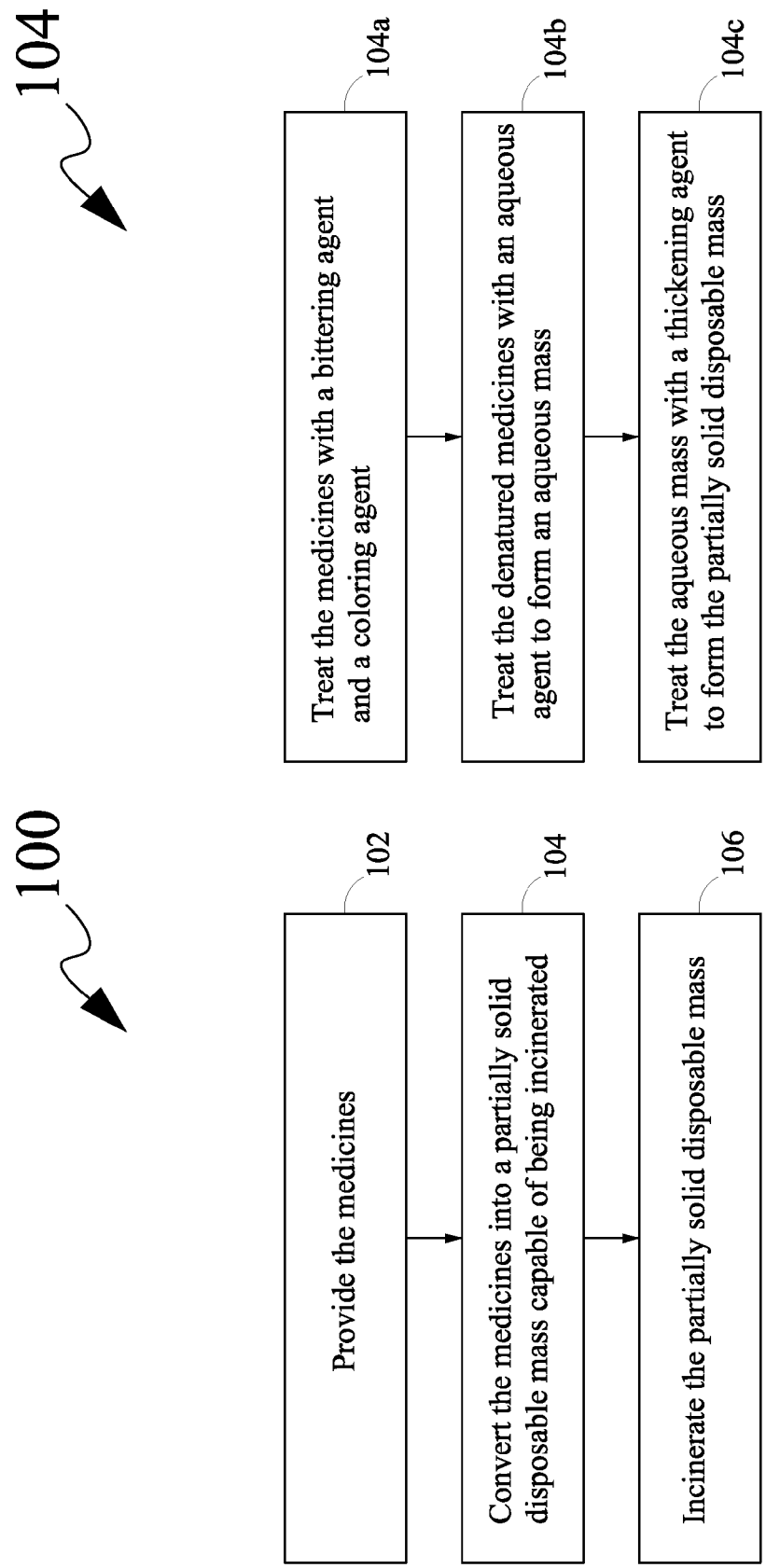
FIG. 1A depicts a block diagram illustrating a method for safely of disposing medicines, according to an embodiment of the present disclosure.
FIG. 1B depicts a block diagram illustrating conversion of the medicines into a partially solid disposable mass, according to an embodiment of the present disclosure.

FIG. 1A depicts a block diagram of a method 100 for safely of disposing medicines, according to an embodiment of the present disclosure. The method 100 includes providing medicines, at 102. It should be understood that in the present disclosure, the term 'medicine' specifically refers to unused or expired medicines. It will be apparent to a person skilled in the art that medicines have a particular shelf life. The medicines that are left unused after the completion of the shelf life become impotent and sometimes harmful if ingested. Such medicines may be referred to as 'expired medicines.' However, it should be clearly understood that the method 100 described herein may also be used for disposing medicines that are unexpired.

The method 100 further includes converting the medicines into a partially solid disposable mass capable of being incinerated, at 104. The conversion of the medicines into the partially solid disposable mass will be explained in detail with reference to FIG. 1B.

FIG. 1B depicts a block diagram illustrating the conversion of medicines into the partially solid disposable mass. As depicted in FIG. 1B, the conversion includes treating the medicines with a bittering agent and a coloring agent, at 104a. It will be apparent to a person skilled in the art that the term 'bittering agent' as mentioned herein refers to a nontoxic chemical or biological compound that is capable of denaturing a substance. In the present disclosure, the bittering agent includes denatonium benzoate (quaternary ammonium cation), which has a property of specifically denaturing alcohol and turning almost every substance bitter. However, it should be clearly understood that use of denatonium benzoate should not be construed as a limitation to the present disclosure. Therefore, use of other bittering agents capable of denaturing the substance they react with may also be considered in the scope of the present disclosure.

The term 'coloring agent' as mentioned herein may refer to a nontoxic chemical or biological compound capable of providing a characteristic color to the medicines denatured by the bittering agent. The characteristic color provided by the coloring agent makes the medicines unattractive. In the present disclosure, the coloring agent includes a red dye. However, it should be clearly understood that use of the red dye should not be considered as a limitation to the present disclosure. Therefore, other coloring agents capable of providing a characteristic color to substances they react with may also be considered in the scope of the present disclosure.

After the formation of the denatured medicines, at 104a, the conversion further includes treating the denatured medicines with an aqueous agent, at 104b. The treatment of the denatured medicines with the aqueous agent leads to formation of an aqueous mass. The term 'aqueous agent' as mentioned herein may refer to a chemical compound capable of providing an aqueous medium. In the present disclosure, the aqueous agent includes water or carbonated water (also referred to as 'soda'). However, it should be clearly understood that use of water or carbonated water should not be considered as a limitation to the present disclosure. Therefore, other aqueous agents capable of providing an aqueous medium may also be considered in the scope of present disclosure.

The aqueous mass formed at 104b, may then be partially solidified. The partial-solidification of the aqueous mass is necessary for easy handling of the aqueous mass. Further, partial-solidification of the aqueous mass prevents any spillage of the aqueous mass. To achieve this, the aqueous mass is treated with a thickening agent to form the partially solid disposable mass, at 104c. The term 'thickening agent' as mentioned herein may refer to a nontoxic chemical compound capable of partially solidifying a substance. More specifically, a thickening agent may solidify the substance by reacting with any water present in the substance. In the present disclosure, the thickening agent includes sodium polyacrylate (also referred to as 'acrylic sodium salt polymer'), which has a capability of absorbing as much as about 200 to about 300 times of water than its mass. However, it should be clearly understood that the use of sodium polyacrylate as the thickening agent should not be considered as a limitation to the present disclosure. Therefore, other thickening agents capable of solidifying a substance they interact with may also be considered in the scope of the present disclosure.

After the conversion of the medicines into the partially solid disposable mass, at 104, the method 100 includes incinerating the partially solid disposable mass, at 106. The incineration of the partially solid disposable mass produces only carbon dioxide and water vapors. Hence, the incineration in such manner allows a safe, clean, and environment friendly disposal of the medicines.

Figure 2:
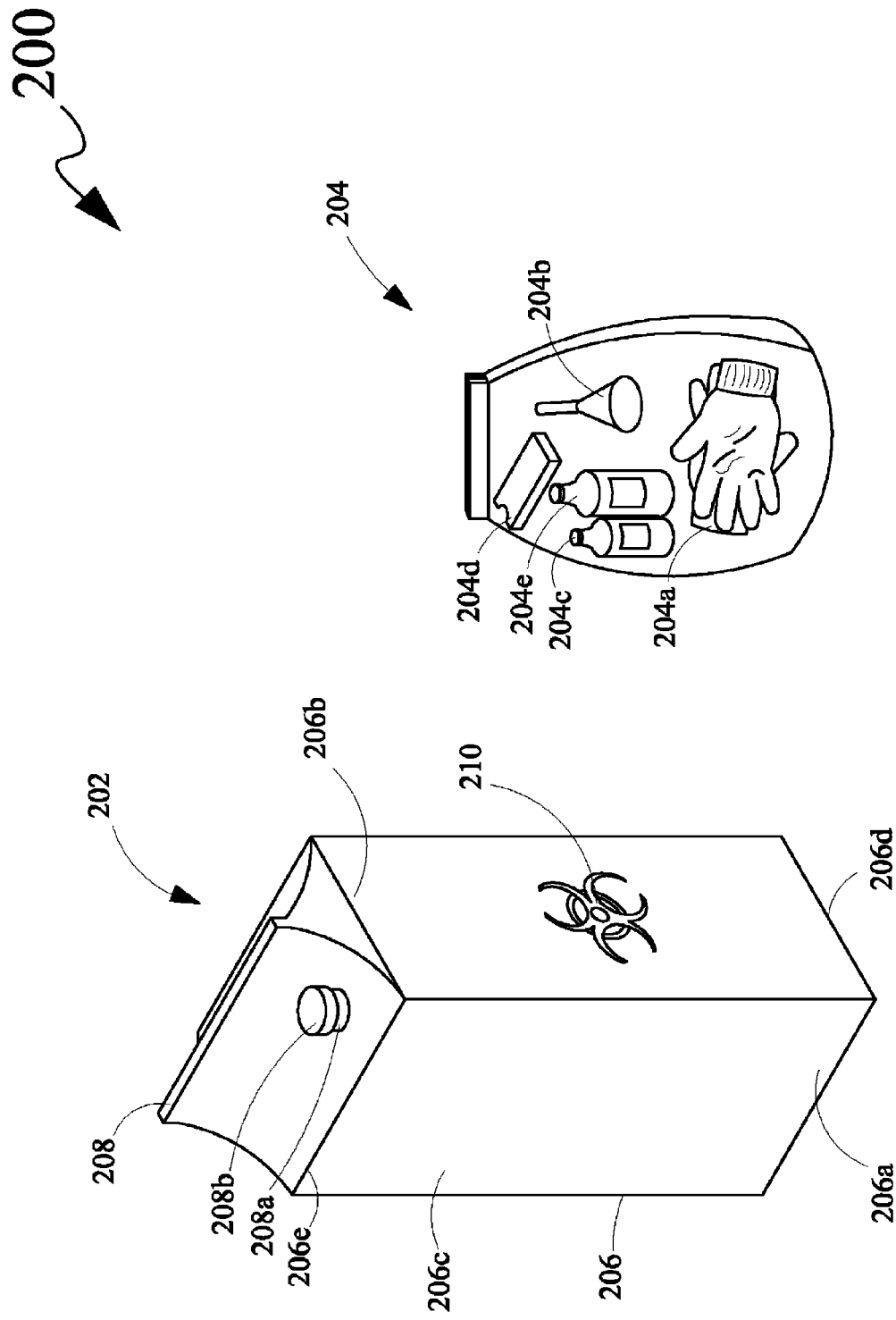
FIG. 2 depicts a perspective view of an apparatus for safely disposing medicines, according to an embodiment of the present disclosure.
Figure 3:
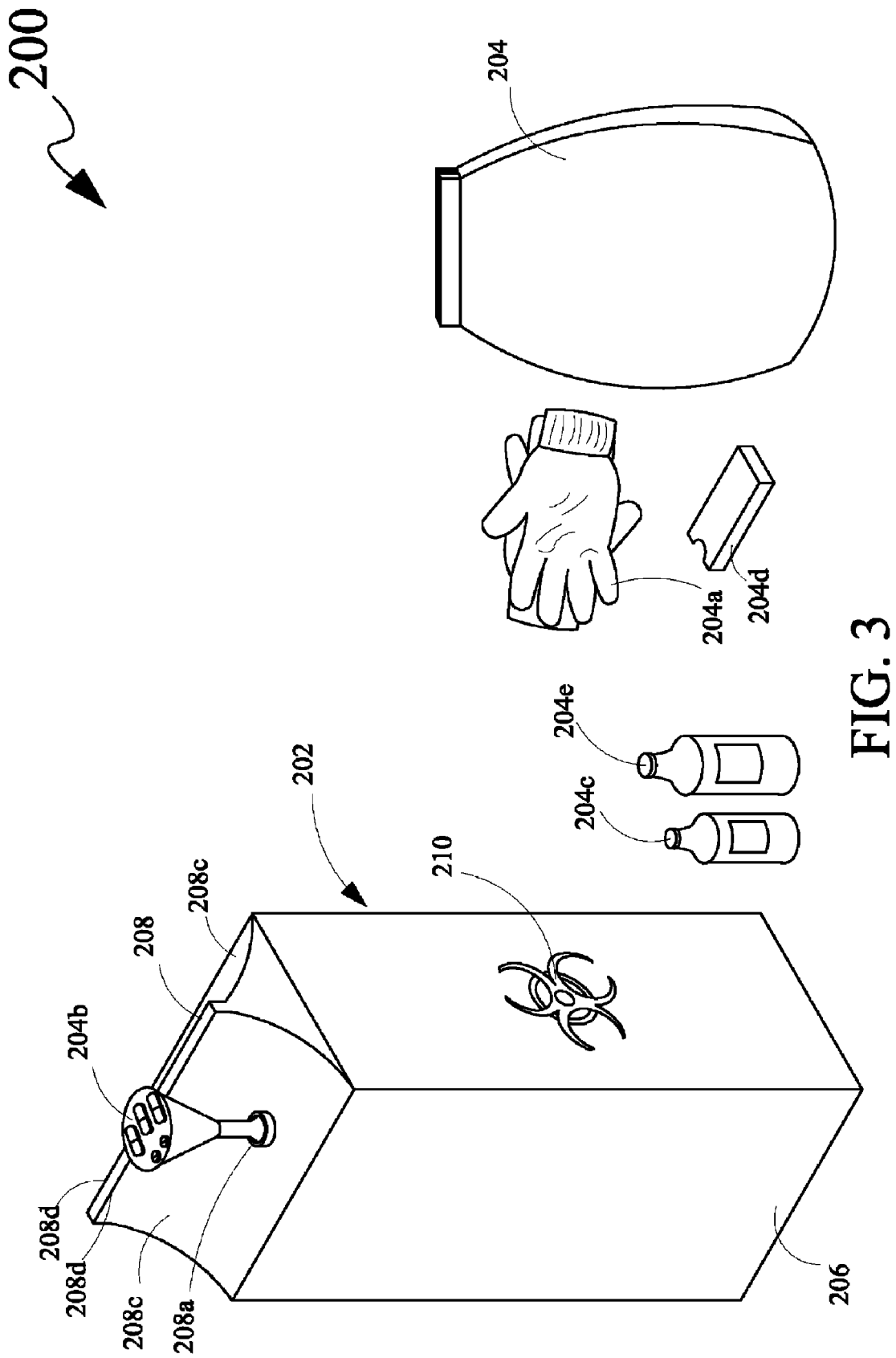
FIG. 3 depicts an unassembled perspective view of the apparatus of FIG. 2, according to an embodiment of the present disclosure.

In another aspect, the present disclosure provides an apparatus for safely disposing medicines. The apparatus is depicted in FIG. 2 and FIG. 3. More specifically, FIG. 2 depicts a perspective view of an apparatus for safely disposing medicines, according to an embodiment of the present disclosure. Further, FIG. 3 depicts an unassembled perspective view of the apparatus of FIG. 2.

As depicted in FIG. 2 and FIG. 3, the apparatus 200 includes a container assembly 202 and a bag 204. The bag 204 is capable of being attached to the container assembly 202. The attachment of the bag 204 with the container member assembly 202 may be provided with the help of a fastener. However, it should be clearly understood that the capability of the bag 204 to be attached to the container assembly 202 should not be construed as a limitation to the present disclosure. Accordingly, in another embodiment of the present disclosure, the bag 204 may be placed inside the container assembly 202.

The container assembly 202 includes a container member 206. The container member 206 includes a bottom portion 206a, a top portion 206b opposite to the bottom portion 206a and a wall member 206c extending from a periphery 206d of the bottom portion 206a. The bottom portion 206a and the wall member 206c configure a housing (not shown) capable of storing medicines and the bag 204 therein.

The container member 206 is cubical in shape. However, it should be clearly understood that such shape of the container member 206 should not be construed as a limitation to the present disclosure. Therefore, the container member 206 may be of other suitable shapes known in the art, such as a cylindrical shape. Furthermore, the container member 206 may be of any suitable size. In the present disclosure, the container member 206 has a volume sufficient enough to store about 2 quarts of medicines.

Further, the container member 206 may be composed of a material selected from the group consisting of a biodegradable material and a recycled material, such as a post-consumer material similar to that used for making milk cartons. In the present disclosure, the container member 206 is composed of a recycled material. The use of biodegradable material may ensure that the container member 206 is capable of natural degradation, thereby preventing any pollution that may be caused to environment due to disposal of the apparatus 200. Further, the use of the biodegradable material and the recycled material may make the apparatus 200 lightweight. However, it should be clearly understood that use of such materials in the container member 206 should not be construed as a limitation to the present disclosure. Therefore, the container member 206 may be composed of other materials, such as a non-biodegradable polymeric material.

The container assembly 202 further includes a lid 208 having one or more openings 208a (only one opening 208a depicted in FIG. 2). The lid 208 is integral to the container member 206. The opening 208a may be in form of a spout extending from a surface of the lid 208. More specifically, the lid 208 extends from a periphery 206e of the top portion 206b of the container member 206. Moreover, the opening 208a is capped using a cap 208b screwed on the opening 208a to insulate contents of the container member 206.

Even more specifically, the lid 208 includes a pair of concave inclining members 208c, with a concave inclining member of the pair of concave inclining members 208c, including the opening 208a. Further, a first set of longitudinal edge portions 208d (distal to the top portion 206b of the container member 206) of the pair of concave inclining members 208c, is removably configured to each other, such that surfaces of the pair of concave inclining members 208c form an acute angle with respect with each other and thereby configure the lid 208. The removable configuring of the first set of longitudinal edge portions 208d may be provided with a fastener (not shown). The fastener may fasten the first set of longitudinal edge portions 208d, thereby closing the lid, or may unfasten the first set of longitudinal edge portions 208d, thereby opening the lid.

However, it should be clearly understood that such configuration of the lid 208 is only for exemplary purposes and should not be construed as a limitation to the present disclosure. Therefore, the lid 208 may be of a shape in accordance to the shape of the container member 206 or any other shape, such as a circular shape. Further, the lid 208 may be of a size in accordance with the size of the container member 206. Moreover, the lid 208 may be composed of a material similar to the material used for manufacturing container member 206. In the present disclosure, the lid 208 is composed of a recycled material, similar to that used in the container member 206.

It should be understood that the lid 208 is capable of insulating the medicines stored in the container member 206, thereby minimizing chances of any undesirable reaction between the stored medicines and external environment. Further, the lid 208 protects contents of the bag 204, when it is placed inside the container member 206. Furthermore, the lid 208 ensures that any odor that may be produced by the stored medicines is confined inside the container member 206. Moreover, the lid 208 may restrict access of the medicines stored inside the container member 206.

As depicted in FIG. 2, the bag 204 includes a pair of gloves 204a, one or more funnels 204b (only one funnel 204b depicted in FIG. 2 and FIG. 3), a first receptacle 204c having a bittering agent, a second receptacle 204d having a coloring agent and a third receptacle 204e having a thickening agent. The bag 204 is similar to conventional reclosable bags, such as a zip-lock bag. Further, the bag 204 may be composed of polymeric materials, such as plastic materials, or biodegradable materials.

In another embodiment of the present disclosure, the apparatus 200 may include various components of the bag 204, such as a pair of gloves 204a, one or more funnels 204b, a first receptacle 204c having a bittering agent, a second receptacle 204d having a coloring agent and a third receptacle 204e having a thickening agent, placed individually in the container member 206 of the container assembly 202. Therefore, it should be understood that the bag 204 may be excluded from the apparatus 200 according to such embodiment.

Now referring again to FIG. 2, the pair of gloves 204a is capable of being worn by a user. It should be understood that the pair of gloves 204a may be similar in shape and size to conventional gloves known in the art and may be composed of materials known in the art. More specifically, a user when intends to handle the medicines may wear the pair of gloves 204a. The wearing of the pair of gloves 204a ensures a hygienic handling of the medicines. Further, after the use the pair of gloves 204a may be disposed.

The funnel 204b is capable of being configured in the opening 208a of the lid 208. The funnel 204b may be similar in shape and size to funnels known in the art. Further, the funnel 204b may be composed of materials known in the art. In the present disclosure, the funnel 204b is composed of a recycled paper material. The funnel 204b allows receiving of the medicines in the container member 206. More specifically, the user may wear the pair of gloves 204a, configure the funnel 204b in the opening 208a of the lid 208 and then insert the medicines in the container member 206. Further, the funnel 204b may be disposed after use.

The first receptacle 204c is similar to a vial known in the art. Further, the first receptacle 204c includes a bittering agent, which is similar to the bittering agent described above. Accordingly, the bittering agent may be capable of denaturing the medicines stored in the container member 206. The second receptacle 204d is similar to a packet known in the art. Further, the second receptacle 204d includes a coloring agent, which is similar to the coloring agent described above. Accordingly, the coloring agent may be capable of providing a characteristic color to the medicines denatured by the bittering agent. The third receptacle 204e is similar to a bottle known in the art. Further, the third receptacle 204e includes a thickening agent, which is similar to the thickening agent described above. Accordingly, the thickening agent may be capable of converting the denatured medicines into a partially solid disposable mass. It should be understood that the partially solid disposable mass capable of being incinerated leading to a safe and environment friendly disposal of the medicines.

To use the apparatus 200 for safely disposing of medicines, the user is required to follow the following procedure. Firstly, the user may unfasten the fastener of the lid 208 and retrieve the bag 204. Thereafter, the user may unzip the bag 204 and remove various contents thereof. The user may then wear the pair of gloves 204a and remove the wrapper of the medicines that are required to be disposed. Thereafter, the user may fasten the fastener of the lid 208, and may uncap the cap provided on the opening 208a of the lid 208. Further, the user may configure the funnel 204b to the opening 208a of the lid 208 and insert the medicines in the container member 206 using the funnel 204b. After the medicines are stored inside the container member 206, the user may treat the medicines with the bittering agent and the coloring agent, by pouring the bittering agent from the first receptacle 204c and the coloring agent from the second receptacle 204d, on the medicines. The user may employ the funnel 204b for this purpose. Further, it should be understood that the bittering agent and the coloring agent may be poured in specific amounts. The bittering agent denatures the medicines, whereas the coloring agent provides a characteristic color to the medicines. Thereafter, the user may treat the denatured medicines with an aqueous agent by filling the container member 206 with an amount of aqueous agent, sufficient to completely submerge the denatured medicines. After the treatment with the aqueous agent, the user may cover the container member 206 with the lid 208.

After the placement of the lid 208, the user may shake the apparatus 200 vigorously for about 10 seconds to about 15 seconds. It should be understood that the user may employ additional shaking mechanism for shaking the apparatus 200. Thereafter, the user may again remove the lid 208 and treat the aqueous mass formed in the container member 206 with a thickening agent, by pouring the thickening agent from the third receptacle 204e on the aqueous mass. The user may then replace the lid 208 and again shake the apparatus 200 for about 15 seconds. The treatment of the aqueous mass with the thickening agent may convert the aqueous mass into a partially solid disposable mass. This partially solid disposable mass is capable of being incinerated. Hence, the user may incinerate the container assembly 202 along with the partially solid disposable mass at the disposal site. Since the container assembly 202 is composed of nontoxic combustible materials, it will burn along with the partially solid disposable mass, producing almost no pollutants. It will be apparent to a person skilled in the art that disposing the medicines in such manner will reduce the efforts of the user in disposing the partially solid disposable mass separately and will eliminate any possibility of any spillage, thereby providing easy transport of the partially solid disposable mass. Furthermore, it will be apparent to a person skilled in the art that incinerators usually generate electricity for domestic consumptions. Therefore, the disposal of the medicines in such manner may additionally contribute to the generation of electricity used for domestic consumption.

In addition to the foregoing description of the apparatus 200, and with respect to shapes and sizes of various components thereof, it should be understood that the apparatus 200 may be manufactured in various customized sizes. Furthermore, the apparatus 200 may include a logo, such as logo 210, embedded or imprinted on at least one of the various components, such as the container member 206, thereof. In another embodiment of the present disclosure, the apparatus 200 may include a logo 'Ecologically Friendly Medication Disposal Container' or 'EFMDC' embedded or imprinted on the container member 206 of the apparatus 200.

Based on the foregoing, the present disclosure provides an apparatus, such as the apparatus 200, that allows safe and environment friendly disposal of medicines. The apparatus may be used by general public, specialized medical institutions (such as hospices) municipalities and drug retailers. Further, the apparatus is such that it prevents any access of the medicines by unauthorized persons. Moreover, the apparatus is composed of lightweight materials, is inexpensive to manufacture and portable. In addition, the apparatus is convenient to use, so that the general public may be able to use the apparatus without any undue problems. Also, the apparatus may be provided in various customized sizes, shapes, and designs. Further, the present disclosure also provides a method for safely disposing the medicines. The method ensures that the medicines are disposed in a safe and environment friendly manner. Further, the method is easy to use so that the general public may be able to use the method without any undue problems.

The foregoing descriptions of specific embodiments of the present disclosure have been presented for purposes of illustration and description. They are not intended to be exhaustive or to limit the present disclosure to the precise forms disclosed, and obviously many modifications and variations are possible in light of the above teaching. The embodiments were chosen and described in order to best explain the principles of the present disclosure and its practical application, to thereby enable others skilled in the art to best utilize the present disclosure and various embodiments with various modifications as are suited to the particular use contemplated. It is understood that various omissions and substitutions of equivalents are contemplated as circumstance may suggest or render expedient, but such are intended to cover the application or implementation without departing from the spirit or scope of the claims of the present disclosure.

What is claimed is:

1. An apparatus for safely disposing medicines, the apparatus comprising:
   a container assembly comprising,
      a container member having
         a bottom portion,
         a wall member extending from a periphery of the bottom portion, and
         a top portion opposite to the bottom portion, wherein the bottom portion and the wall member configure a housing capable of storing the medicines, and
      a lid having one or more openings, the lid integral to the container member and extending from a periphery of the top portion of the container member; and
   a bag capable of being attached to the container member, the bag comprising,
      a pair of gloves capable of being worn by a user for allowing hygienic handling of the medicines,
      one or more funnels capable of being configured in the one or more openings of the lid, the one or more funnels allowing receiving of the medicines in the container member for storing the medicines in the container member,
      a first receptacle having a bittering agent, the bittering agent capable of denaturing the stored medicines,
      a second receptacle having a coloring agent, the coloring agent capable of providing a characteristic color to the denatured medicines, and
      a third receptacle having a thickening agent, the thickening agent capable of converting the denatured medicines into a partially solid disposable mass,
   wherein the partially solid disposable mass is capable of being incinerated, thereby safely disposing the medicines.

2. The apparatus of claim 1, wherein the container member is composed of a material selected from the group consisting of a recycled material and a biodegradable material.

3. The apparatus of claim 1, wherein the bittering agent comprises denatonium benzoate.

4. The apparatus of claim 1, wherein the thickening agent comprises sodium polyacrylate.

5. The apparatus of claim 1, wherein the coloring agent comprises a red dye.

* * * * *